United States Patent
Fukushima et al.

(10) Patent No.: US 6,784,936 B1
(45) Date of Patent: *Aug. 31, 2004

(54) IMAGE-PICKUP DISPLAY APPARATUS

(75) Inventors: Shinya Fukushima, Saitama (JP); Takehiko Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,563

(22) Filed: Aug. 2, 1999

(30) Foreign Application Priority Data

Aug. 3, 1998 (JP) .......................................... 10-219219

(51) Int. Cl.$^7$ ............................................. H04N 5/222
(52) U.S. Cl. ................................................ 348/333.01
(58) Field of Search ........................ 348/333.01, 221.1, 348/220.1, 211.8, 211.13, 211.14, 362, 363, 364, 365, 754, 755; 345/102

(56) References Cited

U.S. PATENT DOCUMENTS

| | | | | |
|---|---|---|---|---|
| 4,746,988 A | * | 5/1988 | Nutting et al. | 348/221.1 |
| 5,793,221 A | * | 8/1998 | Aoki | 345/102 |
| 5,914,700 A | * | 6/1999 | Tonosaki | 345/102 |
| 6,335,760 B1 | * | 1/2002 | Sato | 348/397.1 |
| 6,339,447 B1 | * | 1/2002 | Kurahashi et al. | 345/102 |

FOREIGN PATENT DOCUMENTS

| | | | |
|---|---|---|---|
| JP | 05292364 | * | 5/1993 |
| WO | 9701240 | | 6/1996 |

* cited by examiner

Primary Examiner—Wendy R. Garber
Assistant Examiner—Rashawn N. Tillery
(74) Attorney, Agent, or Firm—Jay H. Maioli

(57) ABSTRACT

An image-pickup display apparatus including a camera unit with: an image-pickup optical system; an image-pickup device having a light intercepting surface at a position of image formation by the image-pickup optical system, a signal processing circuit for generating a picture signal based on an image-pickup signal output by the image-pickup device, and a controller for correcting exposure by controlling the image-pickup device and the signal processing circuit. The display unit also includes: a liquid-crystal display unit having a liquid-crystal display panel and a back-light, a driver for driving and controlling the liquid-crystal display panel, a back-light controller for driving and controlling the back-light, and a picture processor for outputting a driving signal to the driver on the basis of the picture signal generated by the signal processing circuit employed in the camera unit, where receiving a drive/control signal output by the driver employed in the display unit as a feedback signal, the controller employed in the camera unit controls the image-pickup device and the signal processing circuit employed in the camera unit as well as the picture processor and the back-light controller employed in the display unit to put the drive/control signal in an optimum range.

6 Claims, 3 Drawing Sheets

IMAGE-PICKUP DISPLAY APPARATUS

FIELD OF THE INVENTION

In general, the present invention relates to an image-pickup display apparatus comprising a camera unit and a display unit. More particularly, the present invention relates to an image-pickup display apparatus capable of adjusting a display on a display unit thereof in accordance with the brightness of its circumference.

BACKGROUND OF THE INVENTION

Such an image-pickup display apparatus can be utilized as an electronic mirror of an automobile or a portable video camera.

With the image-pickup display apparatus used as an electronic mirror, for example, the camera unit takes a picture of the rear view and displays the picture on the screen of the display unit in close proximity to the driver. In this way, the image-pickup display apparatus can be utilized in place of the conventional side mirrors or the conventional rear-view mirrors.

In the image-pickup display apparatus serving as a portable video camera, on the other hand, the camera unit takes a picture of a photographic object and the screen of the display unit serves as a monitor of the photographic object.

In general, such an image-pickup display apparatus comprises a camera unit for taking a picture of a photographic object and a display unit for displaying the picture based on a picture signal output by the camera unit.

In the camera unit, a picture of a photographic-object image received through an image-pickup optical system is recognized by means of a solid image-pickup device such as a CCD (Charge Coupled Device) and the picture is converted into a picture signal by a signal processing circuit.

The display unit displays a photographed picture based on the picture signal output by the camera unit on a screen such as a liquid-crystal display panel.

By the way, the image-pickup display apparatus with such a configuration is designed so that the camera unit and the display unit independently carry out adjustments in accordance with the brightness of the circumference to produce an optimum picture.

To be more specific, a controller employed in the camera unit controls the image-pickup device and the signal processing circuit to adjust the diaphragm, changes the speed of the so-called shutter and/or adjusts the gain of a signal output by the CCD in accordance with the brightness of the circumference in order to correct the so-called exposure.

On the other hand, a driving controller employed in the display unit changes the contrast and the brightness of a picture appearing on the screen and/or adjusts the brightness of the back-light in accordance with the brightness of the circumference.

It is desirable, however, to carry out adjustments based on the brightness of the circumference so that a picture appearing on the screen of the display unit keeps up with variations in circumference brightness as quickly as possible. With the camera and display units carrying out the adjustments independently, nevertheless, the variation range of the level of a picture signal output by the camera unit increases while the so-called dynamic range of a display appearing on the liquid-crystal display panel of the display unit is narrow in some cases. The dynamic range is a range in which a taken picture can be represented. As a result, the level of the picture signal output by the camera unit goes beyond a dynamic range optimum for the display appearing on the liquid-crystal display panel of the display unit, raising a problem of generation of the so-called white or black collapse.

In addition, with the adjustment by the camera unit shifted along the time axis from the adjustment by the display unit, the level of the picture signal output by the camera unit may temporarily go beyond the dynamic range optimum for the display appearing on the liquid-crystal display panel of the display unit, making it difficult to keep up with variations in circumference brightness in a short period of time.

SUMMARY OF THE INVENTION

It is an object of the present invention addressing the problems described above to provide a picture-pickup display apparatus that is capable of producing an optimum screen display keeping up with variations in circumferential brightness by letting a camera unit and a display unit thereof carry out adjustments in a coordinated manner.

The object described above can be achieved by an image-pickup display apparatus provided by the invention which includes a camera unit comprising an image-pickup optical system, an image-pickup device having a light intercepting surface at a position of image formation by the image-pickup optical system, a signal processing circuit for generating a picture signal based on an image-pickup signal output by the image-pickup device, and a controller for correcting exposure by controlling the image-pickup device and the signal processing apparatus, and a display unit comprising a liquid-crystal display unit having a liquid-crystal display panel and a back-light, a driver for driving and controlling the liquid-crystal display panel, a back-light controller for driving and controlling the back-light, and a picture processor for outputting a driving signal to the driver on the basis of the picture signal generated by the signal processing circuit employed in the camera unit, wherein, receiving a drive/control signal output by the driver employed in the display unit as a feedback signal, the controller employed in the camera unit controls the image-pickup device and the signal processing circuit employed in the camera unit as well as the picture processor and the back-light controller employed in the display unit to put the drive/control signal in an optimum range.

According to the configuration, an image of a photographic object input through the image-pickup optical system and formed on the light intercepting surface of the image-pickup device is recognized by the image-pickup device generating an image-pickup signal which is converted by the signal processing unit into a picture signal. Then, the picture signal is supplied to the picture processor employed in the display unit outputting a driving signal to the driver to drive the liquid-crystal display panel. As a result, a picture appears on the liquid-crystal display panel.

By feeding back a drive/control signal output by the driver employed in the display unit to the controller in the camera unit, information on a picture appearing on the liquid-crystal display panel is supplied to the controller.

As described above, the controller corrects exposure by controlling the image-pickup device and the signal processing apparatus. In addition to the correction of exposure by controlling the image-pickup device and the signal processing circuit, the controller also controls the picture processor and the back-light controller employed in the display unit by referring to the information on the picture appearing on the liquid-crystal display panel so as to adjust the brightness and the contrast of the picture and the brightness of the backlight in order to put the drive/control signal in an optimum range or a dynamic range of the liquid-crystal display panel.

When the circumference is bright, for example, the image-pickup device employed in the camera unit is controlled by increasing the so-called shutter speed so as to lower the level of the picture signal. In this way, saturation of the image-pickup device can be avoided. In addition, the gain of the signal processing circuit is reduced. In the display unit, on the other hand, the brightness and the contrast of the display and the brightness of the back-light are increased so as to make the picture appearing on the liquid-crystal display panel bright.

When the circumference is dark, on the contrary, the image-pickup device employed in the camera unit is controlled by decreasing the so-called shutter speed so as to raise the level of the picture signal. In addition, the gain of the signal processing circuit is increased. In the display unit, on the other hand, the brightness and the contrast of the display are suppressed and the brightness of the back-light is decreased so as to make the picture appearing on the liquid-crystal display panel dark to reflect the circumference.

In another embodiment the camera unit further has a diaphragm device which is used for adjusting the quantity of light hitting the light intercepting surface after passing through the image-pickup optical system, and controlled by the controller along with the image-pickup device and the signal processing circuit in order to put the drive/control signal output by the driver employed in the display unit in an optimum range. The control of the diaphragm itself changes the quantity of light hitting the light intercepting surface after passing through the image-pickup optical system, allowing the controller to correct exposure with ease and with a high degree of reliability over a broad range.

In another embodiment the camera unit and the display unit are provided separately from each other; the camera unit has an output sub-unit for receiving a picture signal from the signal processing circuit; and the display unit has an input sub-unit for inputting a signal output by the output sub-unit employed in the camera unit.

In another embodiment the output sub-unit converts the picture signal into an analog signal and outputs the analog signal; the input sub-unit converts the analog signal received from the output sub-unit into a digital signal. Since the picture signal is transmitted by the camera unit to the display unit as an analog signal as described above, the picture signal can be transmitted with ease.

In another embodiment the output sub-unit transmits the picture signal by modulating a carrier signal, and the input sub-signal demodulates a signal received from the output sub-unit to extract the picture signal. Since the picture signal is transmitted by the camera unit to the display unit by modulation of a carrier signal, the picture signal can be transmitted with a higher degree of reliability by being hardly affected by external noise.

In another embodiment, the camera unit and the display unit are integrated to form a single body to allow a picture signal to be transferred from the signal processing circuit employed in the camera unit to the picture processor employed in the display unit directly. As a result, the circuit configuration can be made simple and the cost can be reduced.

DETAILED DESCRIPTION OF THE PREFERRED EMBODIMENTS

Figure 1:
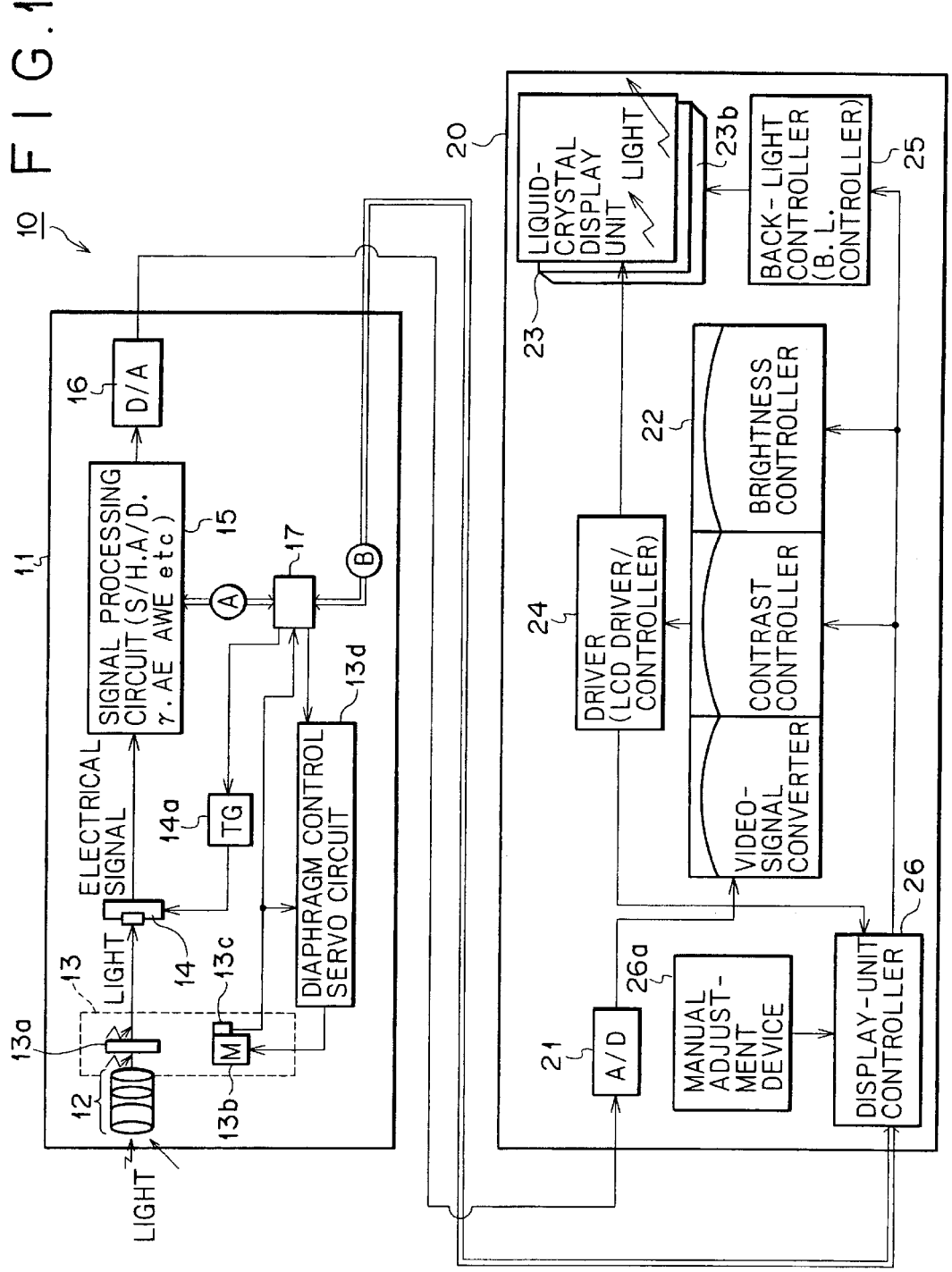
FIG. 1 is a block diagram showing a first embodiment implementing an image-pickup display apparatus provided by the present invention.
Figure 2:
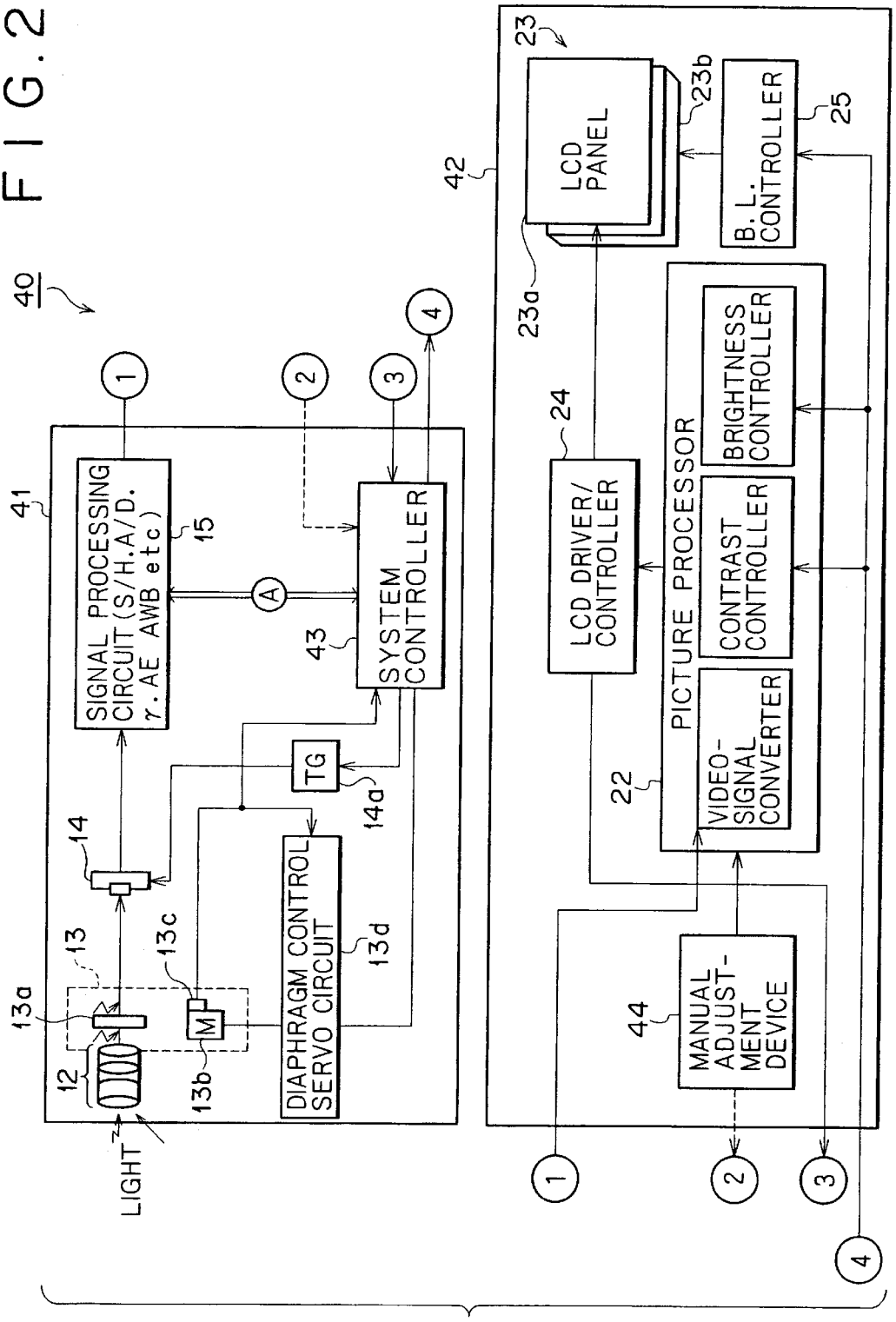
FIG. 2 is a block diagram showing a second embodiment implementing an image-pickup display apparatus provided by the present invention.
Figure 3:
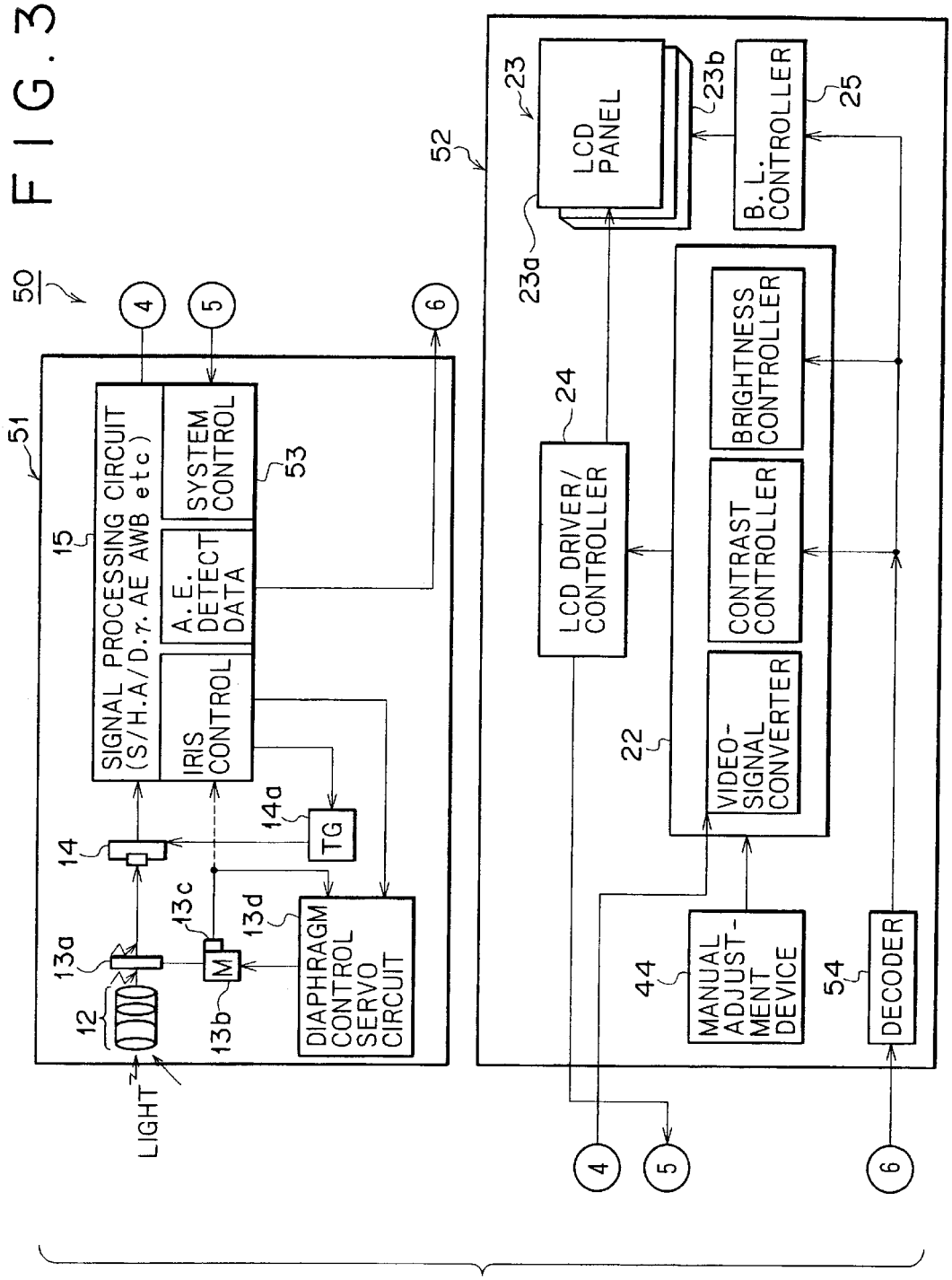
FIG. 3 is a block diagram showing a third embodiment implementing an image-pickup display apparatus provided by the present invention.

Some preferred embodiments of the present invention are explained in detail by referring to FIGS. 1 to 3.

It should be noted that the embodiments described below are preferred embodiments on which some technological desirable limitations are imposed. However, the description is not intended to especially limit the scope of the present invention. That is to say, the scope of the present invention is not limited to the embodiments unless otherwise specified in particular.

FIG. 1 is a block diagram showing a first embodiment implementing an image-pickup display apparatus provided by the present invention.

As shown in FIG. 1, the image-pickup display apparatus 10 comprises a camera unit 11 and a display unit 20 which are provided independently of each other.

The camera unit 11 comprises an image-pickup optical system 12, a diaphragm device 13, an image-pickup device 14, a signal processing circuit 15, an output sub-unit 16 and a camera-unit controller 17.

The image-pickup optical system 12 is an image-pickup compound lens comprising typically a plurality of lenses. Typically, by providing a focusing mechanism and a zooming mechanism which are not shown in the figure to the image-pickup optical system 12, the image-pickup optical system 12 is capable of forming an image of a photographic object on a light intercepting surface of the image-pickup device 14 to be described later.

In the case of the embodiment shown in the figure, the diaphragm device 13 comprises a diaphragm vane 13a located typically on an optical path between the image-pickup optical system 12 and the image-pickup device 14, a diaphragm control motor 13b for driving the diaphragm vane 13a to control the diaphragm squeezing, a detector 13c for detecting the squeezing position of the diaphragm vane 13a and a diaphragm control servo circuit 13d for driving and controlling the diaphragm control motor 13b in accordance with a detection signal output by the detector 13c.

The image-pickup device 14 is typically a solid image-pickup device such as a CCD provided with a light intercepting surface placed at a position at which an image is formed by the image-pickup optical system 12. An image of a photographic object formed on the light intercepting surface is recognized by the image-pickup device 14 to generate a image-pickup signal which is then output to the signal processing circuit 15.

The image-pickup device 14 recognizes the image with timing set by a timing clock signal generated by a timing-clock generator 14a. By properly adjusting the timing clock signal, it is possible to obtain an effect equivalent to that of adjustment of the so-called shutter speed.

The signal processing circuit 15 generates a picture signal based on the image-pickup signal output by the image-pickup device 14. To put it in detail, in the signal processing circuit 15, the image-pickup signal is subjected to a sample-holding process, A/D (analog-to-digital) conversion, γ correction (correction of γ characteristics of the image), an AE (automatic exposure) correction and AWB (automatic white balance) correction to generate a proper picture signal.

In the case of the embodiment shown in the figure, the output sub-unit 16 is a D/A conversion circuit for converting the digital picture signal back into an analog signal.

It should be noted that the output sub-unit 16 and an input sub-unit 21 of the display unit 20 to be described later can be omitted. In this case, the signal processing circuit 15 is connected directly to a picture processor 22 employed in the display unit 20.

The camera-unit controller 17 receives data obtained as a result of the automatic-exposure correction carried out by the signal processing circuit 15, controlling the control servo circuit 13d in accordance with the detection signal output by the detector 13c employed in the diaphragm device 13 described above. The control servo circuit 13d in turn drives the diaphragm vane 13a to properly adjust the squeezing position of the diaphragm vane 13a. The camera-unit controller 17 also controls the timing-clock generator 14a to carry out adjustment equivalent for proper adjustment of the shutter speed.

It should be noted that the camera-unit controller 17 can also be typically designed into a configuration built in the signal processing circuit 15 to form a single body.

On the other hand, the display unit 20 comprises the input sub-unit 21 cited earlier, the picture processor 22 also cited earlier, a liquid-crystal display unit 23 comprising a liquid-crystal display panel 23a and a back-light 23b, a driver 24 for driving and controlling the liquid-crystal display panel 23a, a back-light controller 25 for driving the back-light 23b and a display-unit controller 26 for controlling the picture processor 22 and the back-light controller 25.

In the case of the embodiment shown in the figure, the input sub-unit 21 is an A/D conversion circuit for converting the analog picture signal into a digital picture signal.

In the case of the embodiment shown in the figure, the picture processor 22 comprises a video-signal converter, a contrast controller and a brightness controller. The picture signal received from the input sub-unit 21 is converted by the video-signal converter into a video signal which is supplied to the contrast and brightness controllers for adjusting the contrast and the brightness of the video signal respectively.

The liquid-crystal display panel 23a of the liquid-crystal display unit 23 comprises typically a plurality of cells, that is, a plurality of pixels laid out to form a dot matrix. The individual cells are driven and controlled individually so that the cells as a whole display a picture. The picture is illuminated from the rear side by the back-light 23b so that the picture appears floated.

The driver 24 drives and controls the liquid-crystal display panel 23a on the basis of the video signal generated by the picture processor 22 to display a picture according to the video signal.

The back-light controller 25 drives and controls the back-light 23b, turning on the back-light 23b in order to provide rear-side illumination to the liquid-crystal display panel 23a.

The display-unit controller 26 receives a drive/control signal from the driver 24, controlling the picture processor 22 and the back-light controller 25 so that the picture appearing on the liquid-crystal display panel 23a has properly adjusted brightness and contrast, being illuminated by the back-light 23b from the rear side.

It should be noted that the display-unit controller 26 can be manually adjusted properly by using a manual adjustment device 26a provided on the display unit 20.

In addition, the display-unit controller 26 can also be designed into a configuration built in the picture processor 22 to form a single body.

Furthermore, the camera-unit controller 17 employed in the camera unit 11 is connected to the display-unit controller 26 employed in the display-unit 20, allowing the drive/control signal generated by the driver 24 to be fed back to the camera-unit controller 17 by way of the display-unit controller 26, and the camera-unit controller 17 to control the picture processor 22 as well as the back-light controller 25 employed in the display unit 20 through the display-unit controller 26.

In this arrangement, the camera-unit controller 17 employed in the camera unit 11 is capable of controlling the diaphragm device 13, the picture-pickup device 14 (to be more specific, the timing-clock generator 14a) and the signal processing circuit 15 as well as the picture processor 22 and the back-light controller 25 employed in the display unit 22 through the display-unit controller 26 by referring to the drive/control signal, that is, information on the picture appearing on the liquid-crystal display unit 23 employed in the display unit 20 to give a proper picture display on the liquid-crystal display unit 23.

The image-pickup display apparatus 10 implemented by the embodiment has a configuration described above wherein, in the camera unit 11, light from a photographic object passing through the image-pickup optical system 12 and the diaphragm vane 13a of the diaphragm device 13 forms an image of the object on the light intercepting surface of the image-pickup device 14. The image is recognized by the image-pickup device 14 with timing determined by a timing clock signal output by the timing-clock generator 14a to produce an image-pickup signal. The image-pickup signal is subjected to processing such as a sample-holding process, A/D conversion, γ correction, an AE correction and AWB correction in the signal processing circuit 15 to generate a picture signal; and the picture signal is converted into an analog output picture signal by the output sub-unit 16.

In the display unit 20, on the other hand, the picture signal received by the input sub-unit 21 is supplied to the picture processor 22 which converts the picture signal into a video signal and adjusts the contrast and the brightness of the video signal by using the brightness and contrast controllers respectively before supplying the video signal to the driver 24. The driver 24 outputs a drive/control signal based on the video signal received from the picture processor 22 to the liquid-crystal display panel 23a, driving the liquid-crystal display panel 23a to display a picture. At that time, the liquid-crystal display panel 23a is illuminated by the back-light 23b from the rear side so that the picture on the liquid-crystal display panel 23a appears floated.

The drive/control signal output by the driver 24 is also supplied to the display-unit controller 26, providing the controller 26 with information on the picture appearing on the liquid-crystal display unit 23. The display-device controller 26 feeds back this information on the displayed picture to the camera-unit controller 17 employed in the camera unit 11.

Thus, the camera-unit controller 17 employed in the camera unit 11 controls the diaphragm device 13 to adjust the diaphragm squeezing and controls the timing-clock generator 14a to adjust the so-called shutter speed of the image-pickup device 14 by referring to the information on the picture appearing on the display unit 20 on the basis of, among others, information on the automatic exposure correction received from the signal processing circuit 15 so as to appropriately regulate the quantity of light hitting the light intercepting surface of the image-pickup device 14. In addition, the camera-unit controller 17 also controls the signal processing circuit 15 to adjust the gain thereof.

As a result, an image is created on the light intercepting surface of the image-pickup device 14 from a proper quantity of light, allowing the image-pickup device 14 to be prevented from entering the so-called saturation state. Moreover, the signal processing circuit 15 outputs a picture signal at a proper level.

In addition, the camera-unit controller 17 employed in the camera unit 11 also controls the picture processor 22 and the back-light controller 25 employed in the display unit 20 through the display-unit controller 26 on the basis of the information on the picture appearing on the display unit 20 in order to optimize the picture on the liquid-crystal display unit 23, that is, in order to make the picture appearing on the liquid-crystal display unit 23 fall within a dynamic range.

In this way, the camera-unit controller 17 controls the camera unit 11 and the display unit 20 in a coordinated manner by referring to information on the picture appearing on the display unit 20 so as to optimize the picture appearing on the display unit 20. As a result, on the liquid-crystal display panel 23a of the liquid-crystal display unit 23 employed in the display unit 20, it is possible to display a picture that can be seen with ease.

When the circumference is bright, for example, in the camera unit 11, the diaphragm device 13 is squeezed and/or the timing-clock generator 14a is controlled to increase the so-called shutter speed so that the level of an image-pickup signal generated by the image-pickup device 14 is lowered. As an additional result, the image-pickup device 14 can also be prevented from getting saturated. In addition, the gain of the signal processing circuit 15 can be adjusted to a low value to put a picture signal generated by the signal processing circuit 15 at a proper level.

In the display unit 20, on the other hand, the picture processor 22 is controlled to increase the contrast and the brightness of the picture appearing on the liquid-crystal panel 23a and the back-light controller 25 is controlled to increase the brightness of the illumination provided by the back-light 23b so that, as a result, the picture becomes brighter.

Accordingly, even in a bright circumference, it is possible to display a picture which is bright and has high contrast with a bright back-light 23b properly for the circumference so that the picture can be seen with ease.

In a dark circumference, on the contrary, in the camera unit 11, the diaphragm vane 13a employed in the diaphragm device 13 is released and/or the timing-clock generator 14a is controlled to decrease the so-called shutter speed so that the level of an image-pickup signal generated by the image-pickup device 14 is raised. As a result, the image-pickup signal generated by the image-pickup device 14 can be adjusted to an acceptably proper level. In addition, the gain of the signal processing circuit 15 can be further adjusted to a high value to put a picture signal generated by the signal processing circuit 15 at an eventually appropriate level.

In the display unit 20, on the other hand, the contrast and the brightness of the picture appearing on the liquid-crystal panel 23a are suppressed and the brightness of the illumination provided by the back-light 23b is reduced so that, as a result, the picture becomes darker properly for the circumference.

Accordingly, even in a dark circumference, it is possible to display a picture which is dark and has low contrast with the back-light 23b adjusted to darkness properly for the circumference so that the picture can be seen with ease without dazzling the eyes.

In this way, the level of a picture signal generated by the camera unit 11 is optimized for the brightness of the circumference without regard to whether the circumference is bright or dark, and the brightness of a picture appearing on the liquid-crystal display panel 23a and the brightness of the back-light 23b in the display unit 20 are adjusted properly so that it is possible to display a picture that has neither white collapse nor black collapse going beyond the dynamic range of the liquid-display panel 23a and can be seen with ease.

As described above, in the embodiment, a picture signal generated by the camera unit 11 is converted by the output sub-unit 16 thereof into an analog signal which is converted back into a digital signal by the input sub-unit 21 employed in the display unit 20. It should be noted, however, that the way in which the picture signal is transmitted from the camera unit 11 to the display unit 20 is not limited to these conversions. For example, the picture signal can also be transmitted from the camera unit 11 to the display unit 20 directly without being converted into an analog signal.

As another alternative, the output sub-unit 16 can also transmit the picture signal by properly modulating a carrier signal of a radio wave or an infrared pulse signal to the input sub-unit 21 employed in the display unit 20. In this case, the input sub-unit 21 extracts the picture signal from the received signal by demodulation of the received signal.

FIG. 2 is a block diagram showing a second embodiment implementing an image-pickup display apparatus provided by the present invention.

The image-pickup display apparatus 40 shown in FIG. 2 comprises a camera unit 41 and a display unit 42 which are built to form a single body. Components of the image-pickup display apparatus 40 shown in FIG. 2 identical with those of FIG. 1 are denoted by the same reference numerals as the latter and their explanation is not repeated. The image-pickup display apparatus 40 shown in FIG. 2 is different from the image-pickup display apparatus 10 shown in FIG. 1 in that the output sub-unit 16 and the input sub-unit 21 are omitted from the image-pickup display apparatus 40 shown in FIG. 2. In addition, the camera-unit controller 17 and the display-unit controller 26 employed in the image-pickup display apparatus 10 shown in FIG. 1 are integrated into a single system controller 43 in the image-pickup display apparatus 40 shown in FIG. 2.

In the case of the second embodiment, a manual adjustment device 44 provided on the display unit 20 outputs a control signal directly to the picture processor 22 and the system controller 43 which is provided in the camera unit 41. In this way, information on adjustment is supplied to the system controller 43.

The image-pickup display apparatus 40 with such a configuration has the same effects as the image-pickup display apparatus 10 shown in FIG. 1. In the camera unit 41, an image-pickup signal output by the image-pickup device 14 is processed by the signal processing circuit 15 to generate a picture signal which is supplied directly to the display unit 42 to be displayed on the liquid-crystal display panel 23a employed in the liquid-crystal display unit 23 by way of the driver 24.

At that time, a drive/control signal output by the driver 24 is similarly supplied to the system controller 43 provided in the camera unit 41. The system controller 43 in the camera unit 41 controls the diaphragm device 13 to adjust its squeezing position and properly adjusts the timing-clock generator 14a to regulate the so-called shutter speed of the image-pickup device 14 on the basis of data such as information on automatic exposure correction received from the signal processing circuit 15 by referring to information on the picture appearing on the display unit 42 received as the drive/control signal output by the driver 24 so as to obtain a proper quantity of light hitting the light intercepting surface of the image-pickup device 14. In addition, the system controller 43 also adjusts the gain of the signal processing circuit 15.

As a result, an image of a proper quantity of light is formed on the light intercepting surface of the image-pickup device 14 and the image-pickup device 14 can be prevented from entering the so-called saturation state. In addition, the signal processing circuit 15 generates a picture signal at a proper level.

Moreover, the system controller 43 in the camera unit 41 also controls the picture processor 22 and the back-light controller 25 employed in the display unit 42 on the basis of the information on the picture appearing on the display unit 42 so that the picture displayed on the liquid-crystal display unit 23 is optimized, that is, the picture appearing on the liquid-crystal display panel 23a falls within a dynamic range.

In this way, the system controller 43 controls the camera unit 41 and the display unit 42 in a coordinated manner by referring to the information on the picture appearing on the display unit 42 so that the picture displayed on the liquid-crystal display unit 23 employed in the display unit 42 is optimized. As a result, it is possible to display a picture that can be seen with ease on the liquid-crystal display panel 23a of the liquid-crystal display unit 23 employed in the display unit 42 without regard to whether the circumference is bright or dark.

FIG. 3 is a block diagram showing a third embodiment implementing an image-pickup display apparatus provided by the present invention.

The image-pickup display apparatus 50 shown in FIG. 3 comprises a camera unit 51 and a display unit 52 which are built to form a single body. Components of the image-pickup display apparatus 50 shown in FIG. 3 identical with those of FIG. 2 are denoted by the same reference numerals as the latter and their explanation is not repeated. The image-pickup display apparatus 50 shown in FIG. 3 is different from the image-pickup display apparatus 40 shown in FIG. 2 in that, in place of the system controller 43, a built-in controller 53 is embedded in the signal processing circuit 15 to form a single body, and a decoder 54 is provided in the display unit 52.

The built-in controller 53 has a configuration wherein there is no communication with the camera unit 52 and a drive/control signal generated by the driver 24 employed in the display unit 52 is supplied to the built-in controller 53. By referring to this drive/control signal, the built-in controller 53 controls an exposure controller 15a provided in the signal processing circuit 15 to control the diaphragm control servo circuit 13d employed in the diaphragm device 13. The diaphragm control servo circuit 13d in turn drives the diaphragm vane 13a employed in the diaphragm device 13 at a proper squeezing position. At the same time, the built-in controller 53 controls the timing-clock generator 14a to adjust the so-called shutter speed of the image-pickup device 14.

In addition, the built-in controller 53 controls an automatic exposure corrector 15b provided in the signal processing circuit 15 to output correction data used in automatic exposure correction to the decoder 54 employed in the display unit 52.

The decoder 54 controls the picture processor 22 and the back-light controller 25 on the basis of the automatic exposure correction data.

The image-pickup display apparatus 50 with such a configuration has the same effects as the image-pickup display apparatus 40 shown in FIG. 2. In the camera unit 51, an image-pickup signal output by the image-pickup device 14 is processed by the signal processing circuit 15 to generate a picture signal which is supplied directly to the display unit 52 to be displayed on the liquid-crystal display panel 23a employed in the liquid-crystal display unit 23 by way of the driver 24.

At that time, a drive/control signal output by the driver 24 is similarly supplied to the built-in controller 53 provided in the camera unit 51. The built-in controller 53 in the camera unit 51 controls the exposure controller 15a provided in the signal processing circuit 15, controlling the diaphragm device 13 to adjust its squeezing position and properly adjusts the timing-clock generator 14a to regulate the so-called shutter speed of the image-pickup device 14 by referring to information on the picture appearing on the display unit 52 received as the drive/control signal output by the driver 24 so as to obtain a proper quantity of light hitting the light intercepting surface of the image-pickup device 14. In addition, the built-in controller 53 also adjusts the gain of the signal processing circuit 15.

As a result, an image of a proper quantity of light is formed on the light intercepting surface of the image-pickup device 14 and the image-pickup device 14 can be prevented from entering the so-called saturation state. In addition, the signal processing circuit 15 generates a picture signal at a proper level.

Moreover, the built-in controller 53 employed in the camera unit 51 controls the automatic exposure corrector 15b provided in the signal processing circuit 15 on the basis of information on the picture appearing on the display unit 52 to output correction data used in automatic exposure correction to the decoder 54 employed in the display unit 52. In turn, the decoder 54 controls the picture processor 22 and the back-light controller 25 on the basis of the automatic exposure correction data so that the picture displayed on the liquid-crystal display unit 23 is optimized, that is, the picture appearing on the liquid-crystal display panel 23a falls within a dynamic range.

In this way, the built-in controller 53 controls the camera unit 51 and the display unit 52 through the exposure controller 15a and the automatic exposure corrector 15b in a coordinated manner by referring to the information on the picture appearing on the display unit 52 so that the picture displayed on the liquid-crystal display unit 23 employed in the display unit 52 is optimized. As a result, it is possible to display a picture that can be seen with ease on the liquid-crystal display panel 23a of the liquid-crystal display unit 23 employed in the display unit 52 without regard to whether the circumference is bright or dark.

In each of the image-pickup display apparatuses 10, 40 and 50 implemented by the embodiments described above, there is provided a diaphragm device 13 comprising the diaphragm control motor 13b, the detector 13c and the diaphragm control servo circuit 13d. It should be noted that, by employing a stepping motor in place of the diaphragm control motor 13b, the detector 13c and the diaphragm control servo circuit 13d can be eliminated.

In addition, the diaphragm device 13 is placed typically on the optical path between the image-pickup optical system 12 and the image-pickup device 14. It is worth noting that the diaphragm device 13 can be placed at any location as far as the diaphragm device 13 is capable of adjusting the quantity of light hitting the image-pickup device 14. For example, it is obvious that the diaphragm device 13 can be placed between a plurality of lenses constituting the image-pickup optical system 12.

Each of the image-pickup display apparatuses 10, 40 and 50 implemented by the embodiments described above comprises a camera unit and a display unit. Note that it is obvious that each of them may include a recording/playback unit as is the case with a portable video camera.

What is claimed is:

1. An image-pickup display apparatus comprising:

a camera unit including:

an image-pickup optical system;

an image-pickup device having a light intercepting surface at a position of image formation by said image-pickup optical system;

a signal processing circuit for generating a picture signal based on an image-pickup signal output by said image-pickup device; and a controller unit for correcting exposure by controlling said image-pickup device and said signal processing circuit, and a display unit including:

a liquid-crystal display unit having a liquid-crystal display panel to display a picture and a back-light to illuminate a rear side of said liquid-crystal display panel;

a driver unit producing a drive/control signal fed to said liquid-crystal display unit for driving and controlling a brightness and a contrast of said liquid-crystal display panel and producing a drive/control feedback signal fed to said controller unit;

a back-light controller for driving and controlling a brightness of said back-light; and a picture processor for outputting a driving signal to said driver unit based on said picture signal generated by said signal processing circuit employed in said camera unit, wherein upon receiving said feedback drive/control signal output by said driver unit of said display unit by the signal processing circuit of the camera unit as a feedback signal, said controller unit controls said picture processor and said back-light controller employed in said display unit and controls said image-pickup device and said signal processing circuit of the camera to be in an optimum range of the brightness and contrast of said liquid-crystal display unit.

2. The image-pickup display apparatus according to claim 1 wherein said image-pickup optical system comprises a diaphragm device used for adjusting a quantity of light hitting said light intercepting surface after passing through an optical element of said image-pickup optical system and controlled by said controller unit along with said image-pickup device and said signal processing circuit in response to said drive/control feedback signal output by said driver unit.

3. The image-pickup display apparatus according to claim 1 wherein:

said camera unit and said display unit are provided separately from each other;

said camera unit includes an output sub-unit for receiving a picture signal from said signal processing circuit; and said display unit includes an input sub-unit for inputting a signal output by said output sub-unit employed in said camera unit.

4. The image-pickup display apparatus according to claim 3 wherein:

said output sub-unit converts said picture signal into an analog signal and outputs said analog signal; and said input sub-unit converts said analog signal received from said output sub-unit into a digital signal.

5. The image-pickup display apparatus according to claim 3 wherein:

said output sub-unit transmits said picture signal by modulating a carrier signal; and said input sub-signal demodulates a signal received from said output sub-unit to extract said picture signal.

6. The image-pickup display apparatus according to claim 1 wherein said camera unit and said display unit are integrated to form a single body to allow a picture signal to be directly transferred from said signal processing circuit employed in said camera unit to said picture processor employed in said display unit.

* * * * *